No. 798,412. PATENTED AUG. 29, 1905.
J. C. HOUGH.
COMBINED HOE AND EDGE TRIMMER.
APPLICATION FILED DEC. 31, 1904.
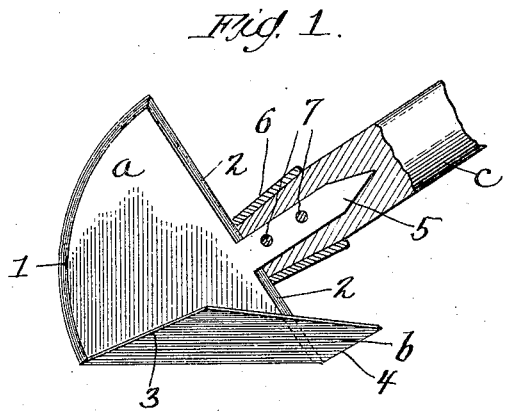
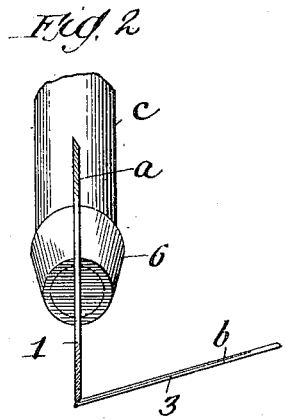
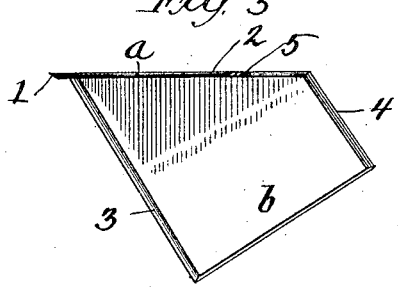
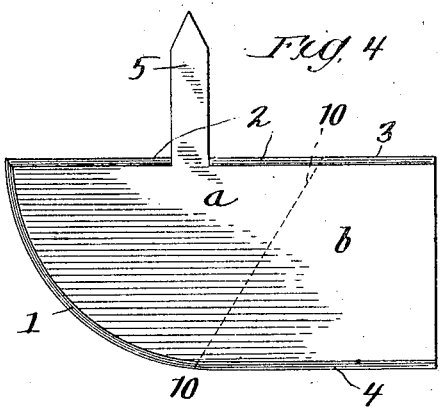
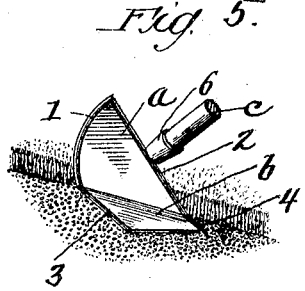
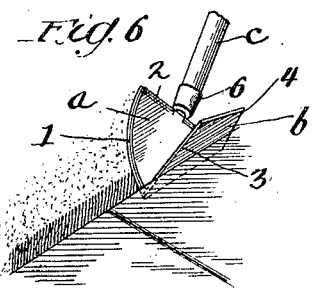
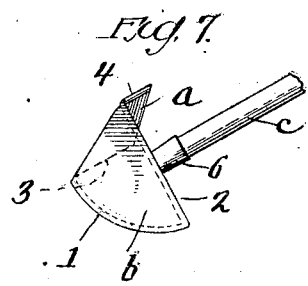
Witnesses:
Luts S. Alter
Fred Gerlach
Inventor:
James C. Hough
By Peirce & Fisher
Attorneys.

UNITED STATES PATENT OFFICE.

JAMES C. HOUGH, OF DALLAS, TEXAS, ASSIGNOR OF ONE-HALF TO J. B. OLDHAM, OF DALLAS, TEXAS.

COMBINED HOE AND EDGE-TRIMMER.

No. 798,412.  Specification of Letters Patent.  Patented Aug. 29, 1905.

Application filed December 31, 1904. Serial No. 239,082.

*To all whom it may concern:*

Be it known that I, JAMES C. HOUGH, a citizen of the United States, and a resident of Dallas, county of Dallas, and State of Texas, have invented certain new and useful Improvements in a Combined Hoe and Edge-Trimmer, of which the following is declared to be a full, clear, and exact description.

The invention relates to an improved form of hoe, and seeks to provide a simple inexpensive tool which may be conveniently used for trimming the edges of lawns, walks, and flower-beds and which may also be used as a weeding scuffle-hoe and as a sod-cutter.

The invention consists in the features of construction and arrangement of parts hereinafter set forth, illustrated in the accompanying drawings, and more particularly pointed out in the appended claims.

In the drawings, Figure 1 is a side view of the improved hoe. Fig. 2 is a front view thereof; Fig. 3, a top view with the handle removed. Fig. 4 is a view of the blank from which the hoe is constructed. Figs. 5 and 6 are perspective views illustrating the improved hoe in use as an edge-trimmer. Fig. 7 is a view of the position of the hoe when used as a sod-cutter.

The hoe comprises separate upright and horizontal blades $a$ and $b$, and each blade is preferably provided with front and rear cutting edges 1, 2, 3, and 4. The blades are preferably formed of a single rectangular blank, (see Fig. 4,) which has a quarter-circle edge at one end which forms the front cutting edge of the upright blade. The blank is bent to form the upright and horizontal blade along a line 10, which is inclined to sides thereof, as clearly indicated in Fig. 4. When thus constructed, it will be observed that the edges of each of the blades are inclined to the plane of the other blade and each cutting edge will have a draw or shear cut, so that the hoe may be used with little effort, even in hard ground.

The handle $c$ is inclined, as shown, to the horizontal blade $b$ and is preferably secured to the rear edge of the upright blade $a$ and in line with the plane of the blade. It should also be noted that the handle is secured to the rear edge 2 of the upright blade and extends substantially at right angles thereto.

The handle may be secured in place by any suitable means. The means illustrated comprises a sharpened lug 5, formed on the rear edge of the upright blade at or about the central position thereof. The lug is inserted into the end of the handle $c$ and the parts bound securely together by a ferrule 6, which surrounds the end of the handle, and bolts 7, which extend through the ferrule, handle, and lug 5.

It will be noted that the improved hoe is of simple and inexpensive construction and comprises few parts, which are securely connected without the use of rivets, which readily become loose.

The improved hoe is employed for general use with the blades in the position shown in Fig. 5. By providing the upright and horizontal blades with front and back cutting edges the hoe may be used by thrusting it away from or drawing it toward the operator. It should be noted that by reason of the peculiar arrangement of the blades all cutting edges are inclined to the line of thrust or pull upon the handle or so disposed as to operate by a shear or draw cut and with little effort on the part of the operator.

The horizontal blade may be used as a scuffle-hoe for weeding and is operated by thrusting and pulling the same back and forth, and the operator does not have to lift it and strike downwardly, as with an ordinary hoe, so that it may be conveniently used to weed about plants and close to fences and the like. The upright blade assists the operation of the hoe when used as a weeder, since it cuts through the ground, so that the horizontal blade may be easily thrust or pulled through the ground, even if it is very hard.

When the improved hoe is used as an edge-trimmer for lawns, flower-beds, and the like, it is used as indicated in Fig. 5. The upright blade $a$ is thrust forward or pulled toward the operator to bring either its front curved edge 1 or its rear straight edge 2 into operation to trim the edge of the lawn. At the same time the front and back edges 3 and 4 of the horizontal blade $b$ operate to clear the adjacent walk of weeds. It should be noted that in this operation the cutting edges 1 and 2 of the upright blade are forwardly inclined and that the front and rear cutting edges of the horizontal blade are rearwardly inclined, (see Fig. 3,) so that they operate with a draw or shear cut. The improved hoe may also be conveniently used for trimming a lawn that adjoins a cement or board walk, as indicated in Fig. 6. Here the hoe is held in position with both blades inclined to the ground and cuts a small shallow trough between the lawn and the walk. The blades are preferably arranged at an angle slightly acute, (see Fig. 2,) so that it may be conveniently used for this purpose.

By turning the hoe over, as indicated in Fig. 7, the upright blade may be conveniently used as a sod-cutter. The curved front and back edges 1 and 2 of this blade join in a sharp point which may be easily thrust into the ground and the sod cut either by a straight thrust or pull upon the handle.

By arranging the handle in line with the upright blade no effort is necessary on the operator's part to keep the hoe from turning sidewise when it is used as an edge-trimmer or sod-cutter. Moreover, the position of the upwardly-inclined handle gives such an elevation to it that the operator need not stoop over to do the work required.

It is obvious that changes may be made in the details of structure without departure from the essentials of the invention.

Having described my invention, what I claim as new, and desire to secure by Letters Patent, is—

1. A combined hoe and edge-trimmer comprising upright and horizontal blades, each having front and rear cutting edges and a handle inclined to the horizontal blade, secured to the center of the rear cutting edge of the upright blade and extending upwardly and rearwardly therefrom in line with said blade and at an angle to its rear cutting edge.

2. A combined hoe and edge-trimmer comprising an upright and a horizontal blade having front and rear cutting edges, the front cutting edge of said upright blade being arc-shaped and meeting its rear cutting edge in a sharp point and a handle arranged in line with said upright blade and extending at substantially right angles to the rear cutting edge thereof.

3. A combined hoe and edge-trimmer comprising an upright and a horizontal blade having rear cutting edges, the edge of said upright blade being upwardly and forwardly inclined and that of said horizontal blade being rearwardly and outwardly inclined, and a handle inclined rearwardly and upwardly and arranged at an angle to said cutting edges.

4. A combined hoe and edge-trimmer comprising an upright and a horizontal blade having rear cutting edges, the rear cutting edge of said upright blade being upwardly and forwardly inclined from the plane of said horizontal blade and a handle secured to the center of the rear cutting edge of said upright blade extending in line with said blade and at right angles to said inclined rear cutting edge.

5. A combined hoe and edge-trimmer comprising upright and horizontal blades, a handle upwardly and rearwardly inclined to said horizontal blade and arranged in line with said upright blade, said blades each having front and rear cutting edges all arranged at an angle to said handle and inclined to the line of thrust.

6. A combined hoe and edge-trimmer formed of a blank substantially rectangular in outline having opposite side cutting edges and bent along the line extending between and inclined to said side edges to form upright and horizontal blades and a handle secured to and in line with said upright blade and arranged at an incline to said horizontal blade.

7. A combined hoe and edge-trimmer comprising upright and horizontal blades, each having front and rear cutting edges, the cutting edges of said horizontal blade being outwardly and rearwardly inclined from the plane of said upright blade and an upwardly and rearwardly inclined handle arranged in line with said upright blade and at an angle to the cutting edges thereof.

8. A combined hoe and edge-trimmer comprising upright and horizontal blades, each having front and rear cutting edges, the cutting edges of said upright blade being upwardly and forwardly inclined from the plane of said horizontal blade, and an upwardly and rearwardly inclined handle arranged in line with said upright blade and substantially at right angles to the rear cutting edge thereof.

9. A combined hoe and edge-trimmer comprising upright and horizontal blades, each having front and rear cutting edges, the rear cutting edge of said upright blade being upwardly and forwardly inclined from the plane of said horizontal blade and the front cutting edge of said upright blade being curved and meeting its rear cutting edge in a sharp point and an upwardly and rearwardly inclined handle secured to the rear edge of said upright blade midway between its ends and extending in line with said upright blade and at substantially a right angle to the rear cutting edge thereof.

10. A combined hoe and edge-trimmer comprising upright and horizontal blades arranged at an acute angle to each other, each having front and rear cutting edges, the cutting edges of said upright blade being upwardly and forwardly inclined from the plane of said horizontal blade, and an upwardly and rearwardly inclined handle secured to said upright blade, substantially as described.

JAMES C. HOUGH.

Witnesses:
 WEBSTER SNYDER,
 GEORGE ROBINSON.